(12) United States Patent
DeDe et al.

(10) Patent No.: US 8,845,898 B2
(45) Date of Patent: Sep. 30, 2014

(54) APU FUEL FILTER HOUSING SCUPPER

(75) Inventors: Brian C. DeDe, San Diego, CA (US); Michael J. Rollins, Chula Vista, CA (US); Melissa A. Bell, San Diego, CA (US); David Lau, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 834 days.

(21) Appl. No.: 12/831,491

(22) Filed: Jul. 7, 2010

(65) Prior Publication Data
US 2012/0006151 A1  Jan. 12, 2012

(51) Int. Cl.
| | |
|---|---|
| F02M 37/22 | (2006.01) |
| F16H 57/02 | (2012.01) |
| B01D 35/30 | (2006.01) |
| B64D 41/00 | (2006.01) |
| F02C 7/32 | (2006.01) |
| B01D 35/00 | (2006.01) |
| B64D 33/00 | (2006.01) |
| B64C 27/04 | (2006.01) |

(52) U.S. Cl.
CPC .................. *B64D 41/00* (2013.01); *B64C 27/04* (2013.01); *F02C 7/32* (2013.01); *F05D 2220/50* (2013.01)
USPC ... 210/248; 210/450; 210/167.02; 210/416.4; 210/416.5; 210/90; 210/143; 74/606 R; 244/53 R; 244/60; 244/135 R; 244/135 B; 244/135 C; 123/179.27; 123/179.7

(58) Field of Classification Search
USPC ............ 210/248, 232, 450, 440, 443, 167.02, 210/416.4, 416.5, 109, 110, 418, 172.1, 210/172.6, 90, 143; 74/606 R; 244/53 R, 60, 244/135 R, 135 A, 135 B, 135 C; 123/179.27, 123/179.7
See application file for complete search history.

(56) References Cited

U.S. PATENT DOCUMENTS

| | | | |
|---|---|---|---|
| 3,343,178 A * | 9/1967 | Palmer ........................ | 210/360.2 |
| 5,132,009 A | 7/1992 | Futa, Jr. et al. | |
| 5,423,661 A * | 6/1995 | Gabeler et al. ............. | 417/410.4 |
| 5,747,680 A | 5/1998 | McArthur | |
| 5,766,449 A | 6/1998 | Davis | |
| 6,037,752 A | 3/2000 | Glennon | |
| 6,216,560 B1 * | 4/2001 | Takada et al. ............... | 74/606 R |
| RE37,165 E | 5/2001 | Davis | |
| 6,471,070 B2 | 10/2002 | Janik | |
| 6,517,710 B2 * | 2/2003 | Hartmann et al. ........ | 210/167.02 |
| 6,610,203 B1 * | 8/2003 | Jainek ........................... | 210/248 |
| 6,631,384 B1 | 10/2003 | Richman et al. | |
| 6,793,042 B2 | 9/2004 | Brouillet | |
| 6,836,086 B1 | 12/2004 | Goldberg et al. | |
| 7,174,273 B2 | 2/2007 | Goldberg | |
| 2008/0028888 A1 * | 2/2008 | Lochocki, Jr. .............. | 74/606 R |

* cited by examiner

*Primary Examiner* — Nam Nguyen
*Assistant Examiner* — Madeline Gonzalez
(74) *Attorney, Agent, or Firm* — Carlson, Gaskey & Olds, P.C.

(57) ABSTRACT

An auxiliary power unit includes a gearbox housing portion and a filter housing portion providing an integral housing. A filter cavity is provided in the filter housing portion. A surface circumscribes the filter cavity. A scupper includes a passage extending from the surface to an opening on an exterior surface of the integral housing. A sealing region between the scupper and the filter cavity is configured to fluidly isolate the scupper and the fuel filter cavity from one another. In one example, the filter cavity receives a fuel filter cartridge. A cap is secured to the filter housing portion and encloses the filter cavity when in a secured position.

15 Claims, 6 Drawing Sheets

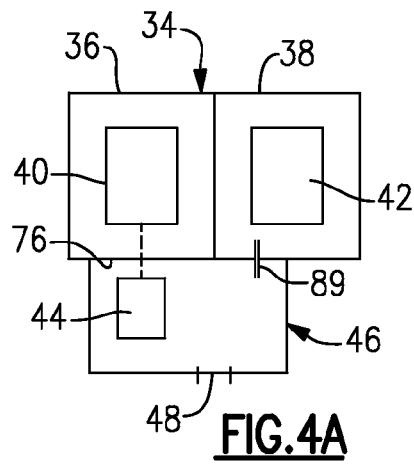
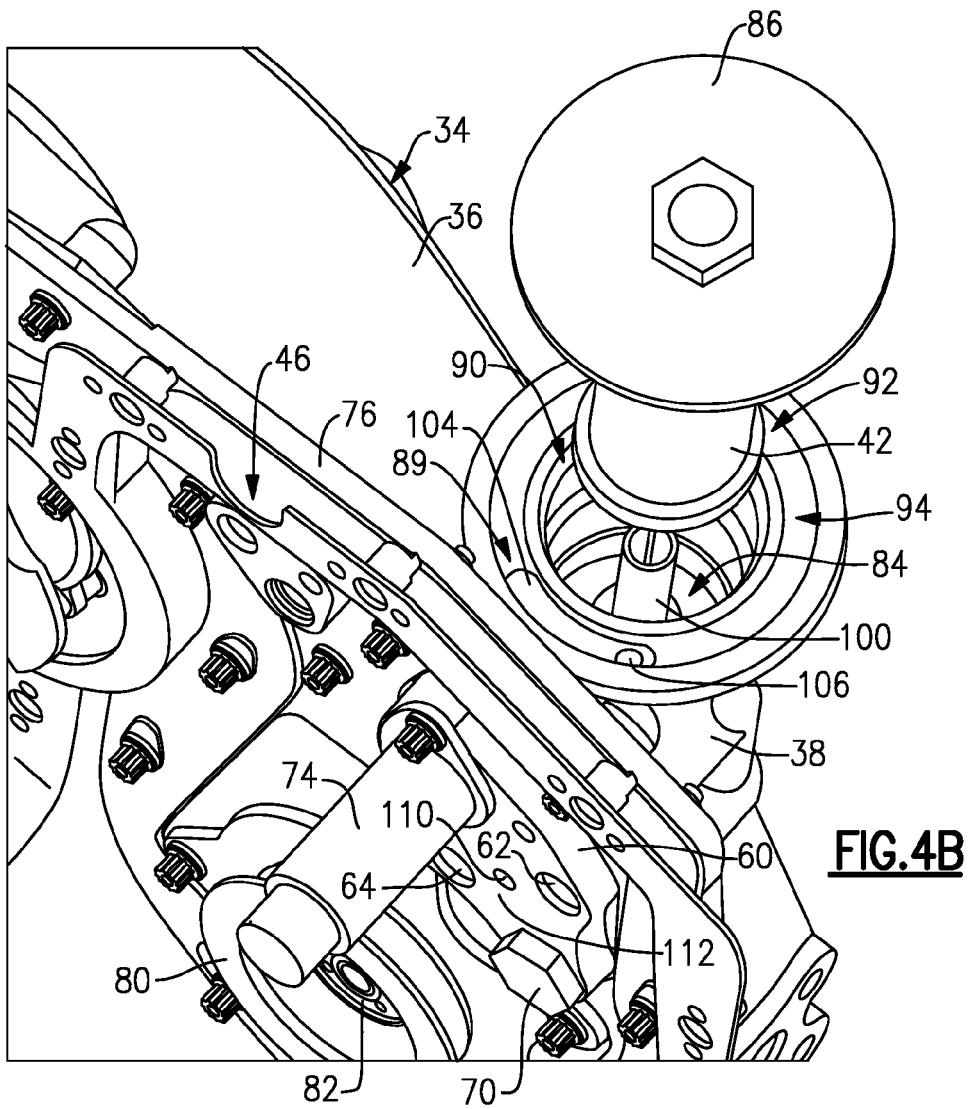

APU FUEL FILTER HOUSING SCUPPER

STATEMENT REGARDING FEDERALLY SPONSORED RESEARCH OR DEVELOPMENT

This invention was made with government support with the United States Navy under Contract No.: N00019-06-C-0081. The government therefore has certain rights in this invention.

BACKGROUND

This disclosure relates to an auxiliary power unit (APU), more particularly, to a fuel filter housing configured for use with the APU.

Many aircraft are equipped with an APU to provide electrical, pneumatic and/or hydraulic power for tasks such as environmental control, lighting, powering electronics, main engine starting, etc. The APU may include a gearbox for obtaining the desired rotational speeds for a variety of rotationally driven components. One example gearbox includes a gearbox housing integrated with a fuel filter housing. The fuel filter housing includes a removable filter cartridge. A cap is removed from the fuel filter housing to provide access to the fuel filter cartridge during its replacement.

SUMMARY

An auxiliary power unit includes a gearbox housing portion and a filter housing portion providing an integral housing. A filter cavity is provided in the filter housing portion. A surface circumscribes the filter cavity. A scupper includes a passage extending from the surface to an opening on an exterior surface of the integral housing. A sealing region between the scupper and the filter cavity is configured to fluidly isolate the scupper and the fuel filter cavity from one another.

A fuel filter housing assembly includes a structure including a filter cavity and a surface circumscribing the filter cavity. A scupper includes a passage extending from the surface to an opening on an exterior surface of the structure. A sealing region between the scupper and the filter cavity is configured to fluidly isolate the scupper and the filter cavity from one another. In one example, the filter cavity receives a fuel filter cartridge. A cap is secured to the structure of the surface and encloses the filter cavity when in a secured position.

BRIEF DESCRIPTION OF THE DRAWINGS

The disclosure can be further understood by reference to the following detailed description when considered in connection with the accompanying drawings wherein:

FIG. 4A is a highly schematic view of an integral housing having gearbox and filter housing portions.

FIG. 4B is an exploded perspective view of a fuel filter housing assembly for the APU.

DETAILED DESCRIPTION

Figure 1:
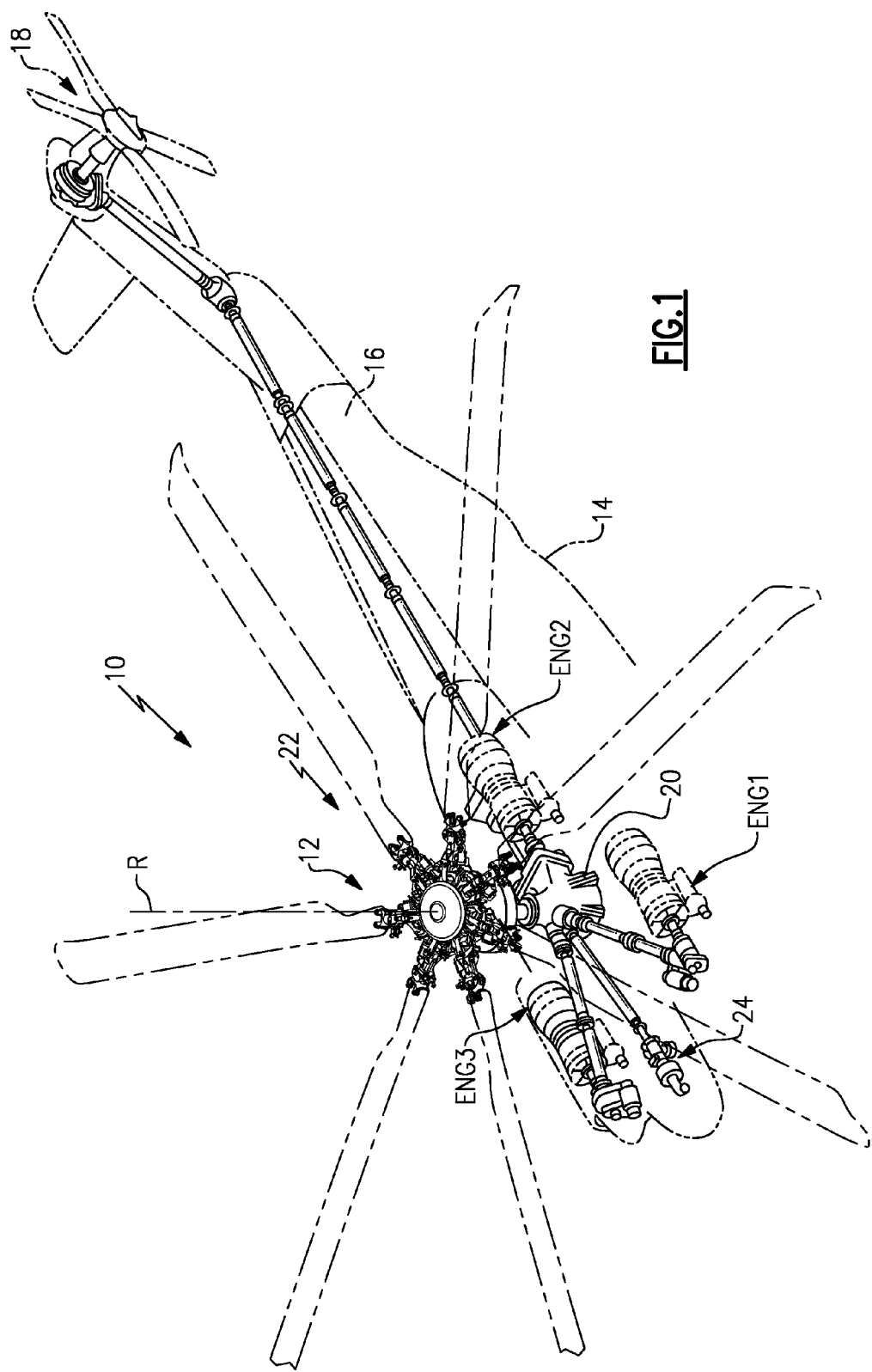
FIG. 1 is a partial phantom view of a rotary-wing aircraft illustrating a power plant system.

FIG. 1 schematically illustrates a rotary-wing aircraft 10 having a main rotor system 12. The aircraft 10 includes an airframe 14 having an extending tail 16 which mounts an anti-torque system 18. The main rotor system 12 is driven about an axis of rotation R through a main rotor gearbox (MGB) 20 by a multi-engine powerplant system 22—here having three engine packages ENG1, ENG2, ENG3 as well as an Auxiliary Power Unit (APU) 24. The engine packages ENG1, ENG2, ENG3 and APU 24 are example of gas turbine engines. The multi-engine powerplant system 22 generates the power available for flight operations and couples such power to the main rotor system 12 through the MGB 20. Although a particular helicopter configuration is utilized to disclose the APU 24, it should be further understood that various vehicles and systems such as ground carts, commercial airplanes and helicopters, military airplanes, LCAC landing craft, tanks etc., will also benefit herefrom.

Figure 2:
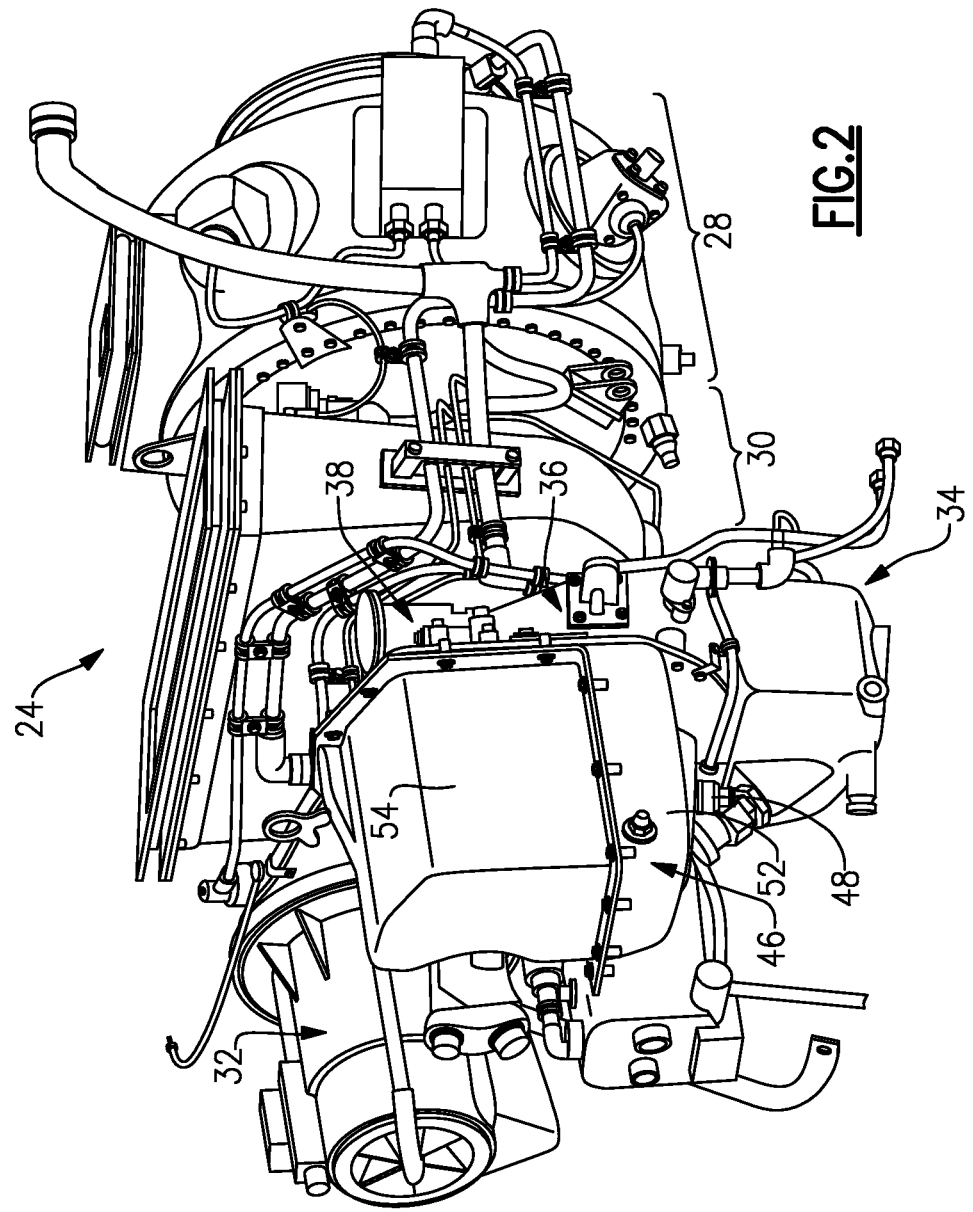
FIG. 2 is a general perspective view of an auxiliary power unit (APU) for use in the power plant system.
Figure 3:
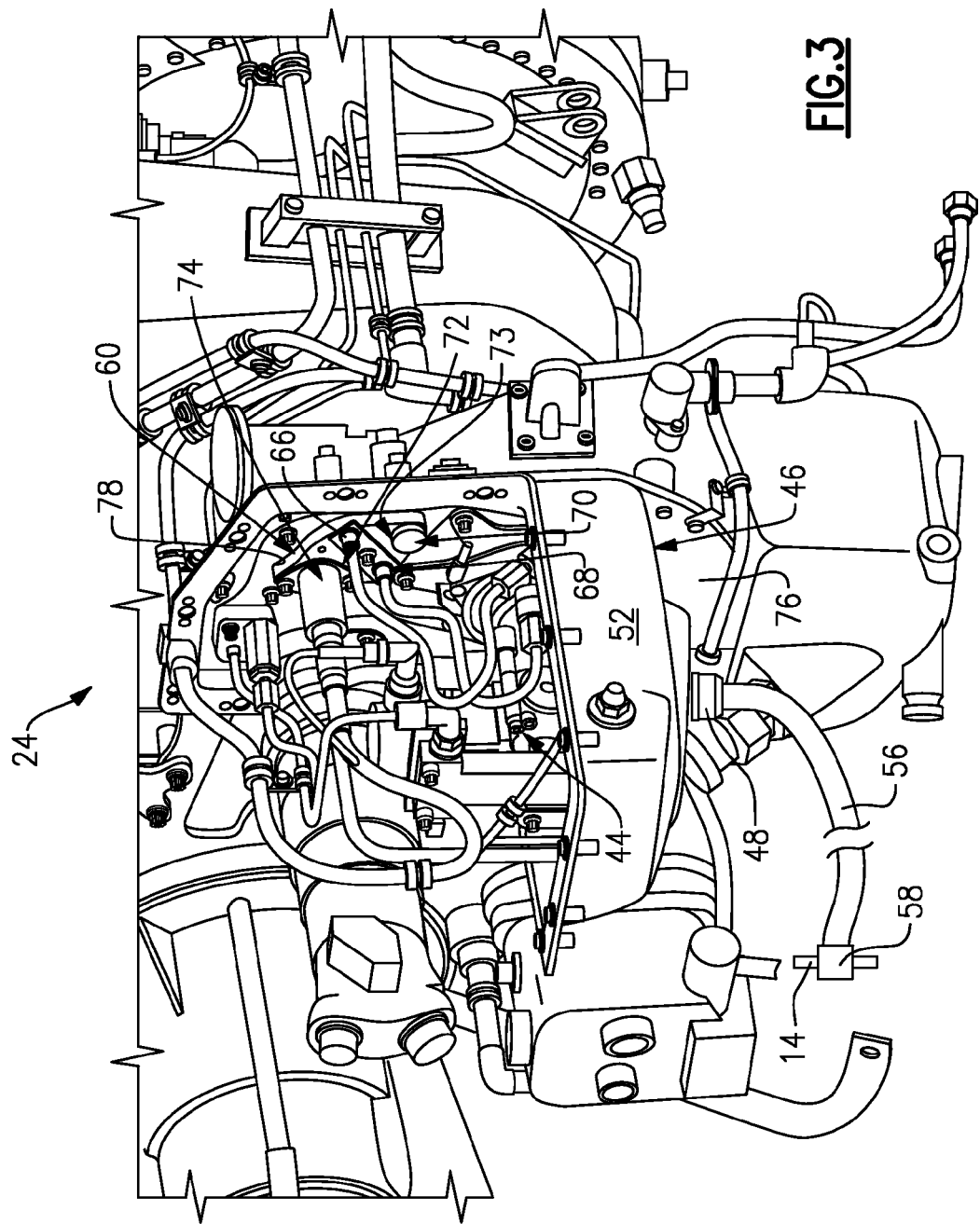
FIG. 3 is an enlarged general perspective view of the APU shown in FIG. 2 with a portion of an enclosure removed.

Referring to FIGS. 2 and 3, one example APU 24 is shown in more detail. The APU 24 includes compressor and turbine sections 28, 30. A cast integral housing 34 is operatively mounted to the turbine section 30 and includes gearbox and filter housing portions 36, 38. The gearbox housing portion 36 includes gears 40 (one of which is shown in FIG. 4A) that rotationally drive various components mounted onto the integral housing 34. A starter 32 may be mounted to the gearbox housing portion 36. One such component is a fuel control unit 44 mounted to a fuel control unit mount 80, best shown in FIGS. 3, 4A, and 4B. The fuel control unit 44 is rotationally driven by the fuel control unit drive 82 via the gear 40.

Returning to FIGS. 2 and 3, an enclosure 46 is operatively supported by the integral housing 34 and surrounds the fuel control unit 44 and various fuel lines, such as fuel inlet and outlet conduits 66, 68. The enclosure 46 collects any fuel that may leak from the fuel control unit 44 or other components and safely disposes the fuel from the aircraft 10. In one example, the enclosure 46 includes a drain 48 that is coupled to an overboard drain 58 via a conduit 56. The overboard drain 58 is mounted to the airframe 14, for example. The enclosure 46 includes a pan 52 beneath the fuel control unit 44 to which the drain 48 is mounted. A cover 54 is removably secured to the pan 52 to enclose the fuel control unit 44 and provide access during service procedures.

The filter housing portion 38 includes a boss 60 providing attachment features, such as a fuel inlet and outlet 62, 64 to which the fuel inlet and outlet conduits 66, 68 are respectively mounted. The boss 60 provides other mounting features, such as a mounts 72, 73 to which a pressure transducer 74 and bypass valve 70 are respectively secured.

A gearbox cover or plate 76 is removably secured over the gearbox housing portion 36. The gearbox cover 76 includes an aperture 78 through which the boss 60 extends. In the example, the enclosure 46 is secured to the gearbox cover 76.

Figure 5A:
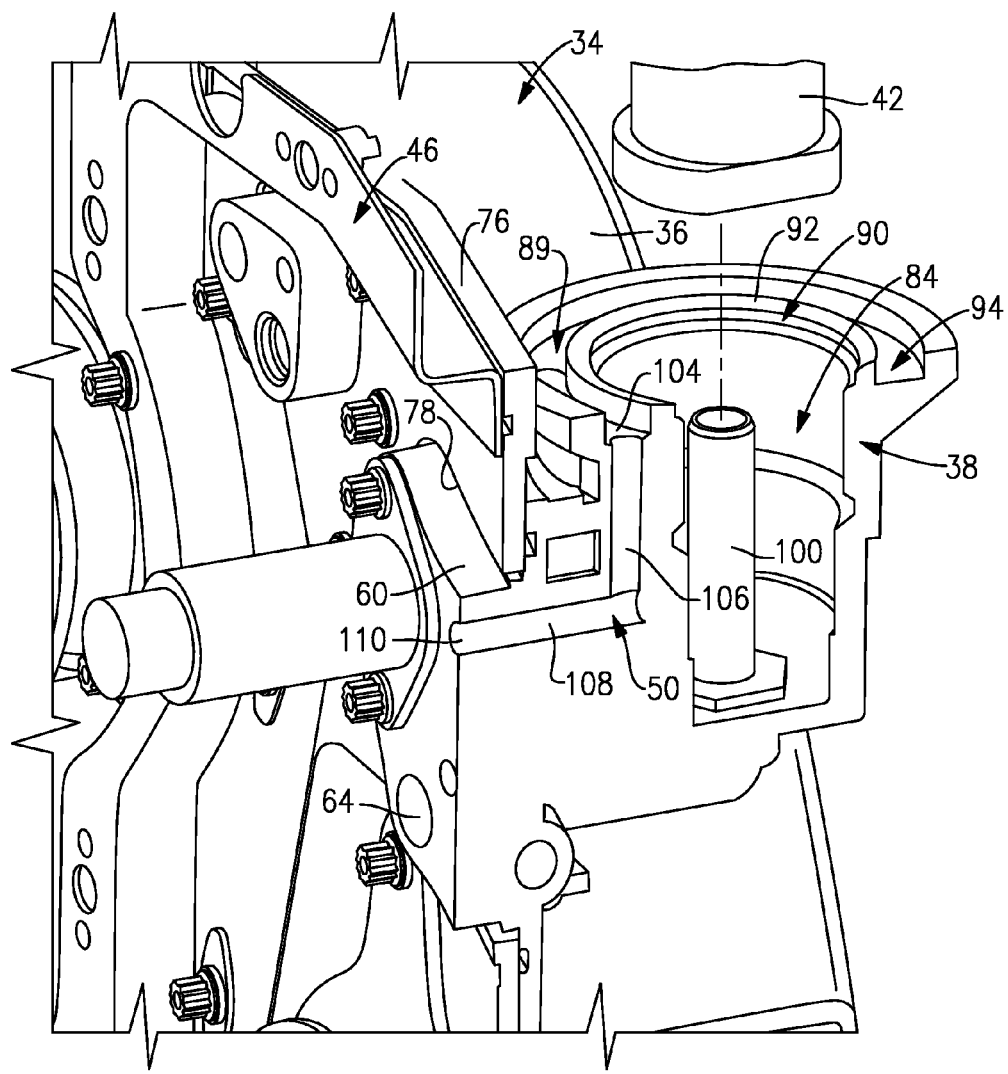
FIG. 5A is a partial cross-sectional perspective view through the fuel filter housing assembly shown in FIG. 4B.
Figure 5B:
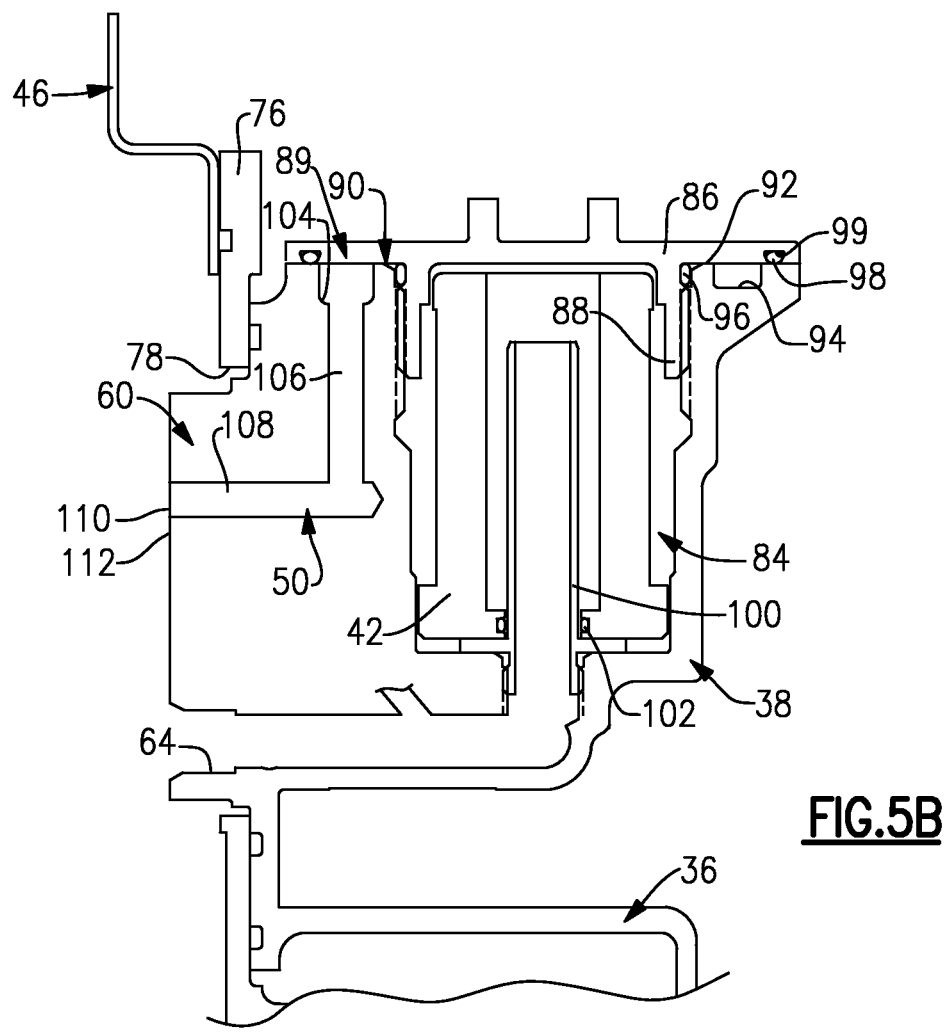
FIG. 5B is a two-dimensional cross-sectional view of the fuel filter housing assembly shown in FIG. 5A.

The filter housing portion 38 includes a filter cavity 84 that receives the fuel filter cartridge 42, best shown in FIG. 5B. A cap 86 including a threaded neck 88 is removably secured to the filter housing 38 over a surface 92. In one example, the cap 86 and integral housing 34 are constructed from aluminum. A sealing region 90 is provided between a scupper 89 and the filter cavity 84. The scupper 89 collects fuel that might drip from the fuel filter cartridge 42 during its removal. The fuel is collected at a surface 92 and safely drained to the enclosure 46 and directed overboard. Referring to FIGS. 5A and 5B, the scupper 89 includes an annular groove 94 provided in the surface 92 that circumscribes the filter cavity 84. The annular groove 94 is in fluid communication with a passage 50 and includes a recess 104 that directs fuel in the annular groove 94 toward the passage 50. The passage 50 includes first and second intersecting holes 106, 108. The second hole 108 extends to an opening 110 in an exterior surface 112 of the boss 60.

The filter cavity 84 includes a stem 100 having an internal passageway that is in fluid communication with the fuel outlet 64. The fuel filter cartridge 42 seals against the stem 100 with a filter seal 102. A first seal 96 is arranged between the cap 86 and the filter housing portion 38 in the sealing region 90, which fluidly isolates the scupper 89 and filter cavity 84 from one another when the cap 86 is secured to the filter housing portion 38. The scupper 89 is generally exposed to atmospheric pressure via the enclosure 46. The second seal 98 is arranged outside of the sealing region 90 and the scupper 89. In one example, a seal recess 99 is provided in the cap 86 to receive the second seal 98.

Although an example embodiment has been disclosed, a worker of ordinary skill in this art would recognize that certain modifications would come within the scope of the claims. For that reason, the following claims should be studied to determine their true scope and content.

What is claimed is:

1. A power unit comprising:
a gearbox housing portion and a filter housing portion providing an integral housing, a gear arranged in the gearbox housing portion;
a filter cavity provided in the filter housing portion, and a surface circumscribing the filter cavity;
a scupper including a passage extending from the surface to an opening on an exterior surface of the integral housing, and a sealing region arranged between the scupper and the filter cavity configured to fluidly isolate the scupper and the filter cavity from one another, wherein the filter cavity receives a filter cartridge, the power unit further comprising a cap secured to the filter housing portion over the surface and enclosing the filter cavity in a secured position; and
first and second seals arranged between the cap and the filter housing portion, wherein the first and second seals are arranged respectively in the sealing region and outside of the sealing region and the scupper, the first and second seals fluidly isolating the filter cavity and scupper from one another in the secured position.

2. The power unit according to claim 1, wherein the passage includes an annular groove in the surface in between the first and second seals, and a hole intersecting the annular groove and extending to the opening.

3. An power unit comprising:
a gearbox housing portion and a filter housing portion providing an integral housing, a gear arranged in the gearbox housing portion;
a filter cavity provided in the filter housing portion, and a surface circumscribing the filter cavity;
a scupper including a passage extending from the surface to an opening on an exterior surface of the integral housing, and a sealing region arranged between the scupper and the filter cavity configured to fluidly isolate the scupper and the filter cavity from one another; and
an enclosure surrounding the opening and including a drain, the scupper exposed to atmospheric pressure.

4. The power unit according to claim 3, wherein the enclosure includes a pan arranged beneath the opening and an access cover removably secured to the pan, the pan including the drain.

5. The power unit according to claim 3, further comprising a fuel control unit arranged in the enclosure and operatively coupled to the gear.

6. A power unit comprising:
a gearbox housing portion and a filter housing portion providing an integral housing;
a filter cavity provided in the filter housing portion, and a surface circumscribing the filter cavity; and
a scupper including a passage extending from the surface to an opening on an exterior surface of the integral housing, and a sealing region arranged between the scupper and the filter cavity configured to fluidly isolate the scupper and the filter cavity from one another, wherein the filter housing portion includes a boss providing the opening, the boss providing attachment features.

7. The power unit according to claim 6, wherein the attachment features includes a fluid inlet and a fluid outlet in fluid communication with the filter cavity.

8. The power unit according to claim 6, wherein the attachment features provide a mount, and a pressure transducer is secured to the mount.

9. The power unit according to claim 6, comprising a plate secured to the gearbox housing portion, the plate including an aperture through which the boss extends.

10. The power unit according to claim 9, comprising an enclosure operatively secured to the plate and surrounding the opening, the enclosure including a drain.

11. A fuel filter housing assembly comprising:
a structure including a filter cavity and a surface circumscribing the filter cavity;
a scupper including a passage extending from the surface to an opening on an exterior surface of the structure, and a sealing region arranged between the scupper and the filter cavity configured to fluidly isolate the scupper and the filter cavity from one another; and
an enclosure that is different than and removable from the structure surrounds the opening, the enclosure includes a drain that is different than the passage, the scupper is exposed to atmospheric pressure with the drain installed into the enclosure.

12. The assembly according to claim 11, wherein the filter cavity receives a filter cartridge, the fuel filter housing assembly further comprising a cap secured to the structure over the surface and enclosing the filter cavity in a secured position.

13. The assembly according to claim 12, further comprising first and second seals arranged between the cap and the structure, wherein the first and second seals are arranged respectively in the sealing region and outside of the sealing region and the scupper, the first and second seals fluidly isolating the filter cavity and the scupper from one another in the secured position.

14. The assembly according to claim 12, wherein the structure includes a fluid inlet and a fluid outlet in fluid communication with the filer cavity.

15. A fuel filter housing assembly comprising:
a structure including a filter cavity and a surface circumscribing the filter cavity;
a scupper including a passage extending from the surface to an opening on an exterior surface of the structure, and a sealing region arranged between the scupper and the filter cavity configured to fluidly isolate the scupper and the filter cavity from one another, wherein the passage includes an annular groove in the surface, and a hole intersecting the annular groove and extending to the opening, the annular groove including a recess to which the hole extends; and
an enclosure that is different than the structure surrounds the opening and includes a drain that is different than the passage, the scupper is exposed to atmospheric pressure.

* * * * *

UNITED STATES PATENT AND TRADEMARK OFFICE
CERTIFICATE OF CORRECTION

| | |
|---|---|
| PATENT NO. | : 8,845,898 B2 |
| APPLICATION NO. | : 12/831491 |
| DATED | : September 30, 2014 |
| INVENTOR(S) | : Brian C. DeDe et al. |

Page 1 of 1

It is certified that error appears in the above-identified patent and that said Letters Patent is hereby corrected as shown below:

IN THE CLAIMS:

In claim 3, column 3, line 47; delete "An" and replace with --A--

In claim 14, column 4, line 50; delete "filer" and replace with --filter--

Signed and Sealed this
Thirtieth Day of December, 2014

Michelle K. Lee
*Deputy Director of the United States Patent and Trademark Office*